(12) United States Patent
Kuehnemann et al.

(10) Patent No.: US 8,583,277 B2
(45) Date of Patent: Nov. 12, 2013

(54) METHOD AND AUTOMATED MANIPULATOR SYSTEM FOR PALLETIZING PACKAGES DEPENDENT ON A GRIP POSITION OF THE PACKAGES

(75) Inventors: Ralf Kuehnemann, Stadtbergen (DE); Lars Baldes, Augsburg (DE); Gerda Ruge, Augsburg (DE)

(73) Assignee: Kuka Roboter GmbH, Augsburg (DE)

( * ) Notice: Subject to any disclaimer, the term of this patent is extended or adjusted under 35 U.S.C. 154(b) by 762 days.

(21) Appl. No.: 12/715,428

(22) Filed: Mar. 2, 2010

(65) Prior Publication Data

US 2010/0221094 A1 Sep. 2, 2010

(30) Foreign Application Priority Data

Mar. 2, 2009 (DE) .......................... 10 2009 011 294

(51) Int. Cl.
*B65G 57/22* (2006.01)
(52) U.S. Cl.
USPC ....................................................... 700/217
(58) Field of Classification Search
USPC ....................................................... 700/217
See application file for complete search history.

(56) References Cited

U.S. PATENT DOCUMENTS

| 5,908,283 | A | | 6/1999 | Huang et al. | |
|---|---|---|---|---|---|
| 6,164,900 | A | * | 12/2000 | Labell et al. | 414/792.1 |
| 6,401,007 | B1 | * | 6/2002 | Yablonovitch | 700/225 |
| 2005/0246056 | A1 | * | 11/2005 | Marks et al. | 700/213 |
| 2008/0025834 | A1 | * | 1/2008 | Ponti et al. | 414/799 |
| 2008/0046116 | A1 | * | 2/2008 | Khan et al. | 700/230 |
| 2009/0171500 | A1 | * | 7/2009 | Matsumoto et al. | 700/217 |
| 2010/0324729 | A1 | * | 12/2010 | Ruge | 700/245 |

FOREIGN PATENT DOCUMENTS

WO WO 2008/083936 7/2008

OTHER PUBLICATIONS

U.S. Appl. No. 12/521,603.

* cited by examiner

*Primary Examiner* — Gene Crawford
*Assistant Examiner* — Kyle Logan
(74) *Attorney, Agent, or Firm* — Schiff Hardin LLP

(57) ABSTRACT

In a method for palletizing packages using an automated manipulator, and a non-transitory computer-readable medium encoded with programming instructions for implementing the method, a sequence of grip positions is designated for accepting packages with the automated manipulator, and a supply of provided packages is automatically checked with regard to the grip positions of the packages in the supply. The supplied packages are palletized according to a predetermined initial palletizing pattern as long as the packages are supplied in the grip positions in the sequence. The packages are palletized by the manipulator according to an alternate palletizing pattern, different from the initial palletizing pattern, in the event that a package is not supplied to the manipulator in a grip position in the sequence.

20 Claims, 3 Drawing Sheets

METHOD AND AUTOMATED MANIPULATOR SYSTEM FOR PALLETIZING PACKAGES DEPENDENT ON A GRIP POSITION OF THE PACKAGES

BACKGROUND OF THE INVENTION

1. Field of the Invention

The present invention concerns a method and a device to palletize packages by means of a manipulator, in particular a robot.

2. Description of the Prior Art

For example, it is known from DE 10 2007 001 263 A1 to stack individual goods or goods containers (which are uniformly designated as "packages" in the following) into package stacks by means of an automatic palletizing machine or robot, i.e. to palletize them. For this the positions of the individual packages in the package stack must be predetermined in a palletizing or loading pattern.

To generate such a palletizing pattern, offline algorithms are known on the one hand in which the palletizing pattern is predetermined in advance on the basis of all packages to be palletized. Package stacks can thus be advantageously optimized with regard to one or more quality criteria and boundary conditions and, for example, densely packed and stable stacks can be generated and relations between packages (for example a parallel arrangement of packages of the same good type) can be taken into account.

A sequence of gripping or approach positions in which the manipulator must take up the packages then results from the globally optimal palletizing pattern of such a type. If the packages are, for example, individually delivered on a continuous transporter, this series of grip positions determines the order in which the packages must be delivered. If this order is disrupted, the preplanned palletizing pattern cannot be executed.

For this purpose, it is known to then manually handle packages, for example to correct the order of the delivered packages by insertion, removal or exchange of packages, or to finish the palletizing by hand. Like any manual intervention in automated processes, this reduces the reliability and the achievable operating and cycle times, requires extensive safety measures to protect the personnel in interaction with manipulators, and is not possible for some packages due to the weight of the packages or the dimensions of packages, stacks or palletizing station.

Another known solution is to always maintain multiple packages—for example by buffering delivered packages in a sorter, for example a ring buffer, or providing different homogenous package reserves (stores)—so that it is ensured that a package provided to be accepted with the manipulation is always made available in a predetermined grip position. However, given a large number of different packages, neither are effective nor can be realized without significant cost in storage space.

From EP 1 211 203 B1, an online method is known in which the palletizing pattern is provided directly on the basis of packages actually provided in grip positions. For this a position in the previously generated sub-stack is calculated for every package from a buffer. A disadvantage of this approach is that only a locally optimized palletizing pattern is generated, such that the entire stack is normally worse with regard to packing density, stability or other quality criteria and boundary conditions relative to a stack planned in advance under consideration of all packages to be palletized.

SUMMARY OF THE INVENTION

An object of the present invention is to improve the palletizing of packages by means of a manipulator.

This object is achieved in accordance with the present invention by a method to palletize packages using an automated manipulator controlled by a control unit, wherein the control unit stores a sequence of grip positions to accept packages with a gripper of the manipulator, and automatically checks respective grip positions in a supply of packages provided to the manipulator for palletizing by the manipulator. The control unit operates the manipulator to palletize the packages according to a predetermined initial palletizing pattern as long as the packages in the supply of packages are supplied in the respective grip positions. The control unit operates the manipulator to palletize the packages according to an alternate palletizing pattern, differing from the initial palletizing pattern, if one of the packages in the supply of packages is not supplied in a grip position in the stored sequence.

The method according to the invention is particularly suitable for palletizing mixed package stacks made up of different packages with different dimensions by means of a manipulation, in particular an industrial robot.

An initial palletizing pattern and a series of grip positions to accept packages with the manipulation are thereby initially provided. Both can already take place by means of one of the known offline algorithms before delivery of packages in grip positions. It is thereby advantageously possible to generate a globally optimal initial palletizing pattern which, for example, exhibits a high packing density and/or stability or in which a predetermined relationship of packages within the package stack to be generated (for example according to goods groups or price groups) is taken into account. The computation time in the generation of the pattern is also not critical.

The grip positions are defined as a series by, for example, the position and/or orientation of the packages to be accepted by the manipulator relative to said manipulator, for example over time, a palletizing cycle, a position of the manipulator and/or a conveyor device or an already-generated partial stack. For example, if the packages to be palletized are supplied individually on a continuous transporter, the grip positions determine the order of the packages on the transporter and their travel path so that the required package is respectively present in a grip position (that is advantageously the same for all packages) if it should accepted by the manipulator according to the palletizing pattern and be transported to the package stack being created. Multiple different grip positions that the manipulator can take up in series in order to accept the packages provided there can also be provided in the form of a buffer. For example, if two continuous transporters are arranged in parallel, a first grip position can be provided on the one transporter and a second grip position on the other transporter, in which grip positions the packages to be accepted next according to the palletizing pattern can be transported in alternation.

Before the manipulator accepts a package, it is checked whether a package provided as the next to be accepted is provided in the grip position that is to be approached next. As long as this is the case, the manipulator palletizes the packages according to the predetermined initial palletizing pattern. If no disruption occurs in providing the packages, the package stack is generated according to the advantageous initial palletizing pattern that was planned in advance.

However, in the event that it is established in the check that a provided packet is not supplied in a grip position, in particular the next grip position that is to be approached, the manipulator palletizes the packages according to an alternative palletizing pattern deviating from the initial palletizing pattern. Longer interruptions of the palletizing process (as they have previously occurred given disruptions in the provision during the execution of an offline, planned palletizing pattern) can advantageously be avoided due to this flexible reaction of the manipulator, and the packages can essentially be transported without interruption into grip positions.

In a preferred embodiment, an alternate palletizing pattern is only provided during the palletizing (in particular online as soon as it is established that no provided package is supplied in a grip position. Known online algorithms or (advantageously) essentially the same algorithm with which the initial palletizing pattern is also provided can be used for this. However, while the initial palletizing pattern is provided on the basis of all packages to be palletized and a free initial loading area (for example an empty pallet), the alternate palletizing pattern is provided on the basis of the packages actually provided in grip positions and the already-generated partial package stack. For this only the packages actually provided in grip positions must thus be provided as a package reserve, and the top side of the already-generated partial package stack is provided as the initial loading surface. Alternatively, it is possible to plan one or more alternate palletizing patterns in advance and, for example, to select a suitable one of these alternate palletizing patterns depending on the already-generated partial stack and/or packages actually provided in grip positions.

The alternate palletizing pattern can be planned on the basis of all packages actually supplied in grip positions and/or theoretical packages still to be palletized, up to the point of complete package stacks. However, an alternate palletizing pattern is preferably planned only in steps to arrange the respective next package actually supplied in the grip position or the respective next packages actually supplied in the grip positions in order to be able to react quickly to the plurality of variants of possible disruptions.

In particular if an alternate palletizing pattern is generated only in steps, the package stack can converge at an unsuitable (for example unstable) stack. In the specification of an alternate palletizing pattern it can therefore be advantageous to provide multiple possible storage areas (in particular additional pallets) to which the palletizing can deviate. If it is then established in the specification of the alternate palletizing pattern that a characteristic value (for example for the stability) of a package stack planned according to the initial palletizing pattern with regard to the original storage area cannot be maintained, these other storage areas are switched to. Packages actually supplied in the grip positions are thus distributed to multiple partial package stacks as soon as they can no longer all be arranged on the original storage area according to the initial palletizing pattern due to a disruption in the delivery or a step-by-step online algorithm that is poorer in this respect. Two or more such partial package stacks can possibly be subsequently merged.

The packages actually supplied in grip positions, the actual palletized packages and/or the possible storage areas are preferably displayed at least during the execution of an alternate palletizing pattern in order to enable a visual monitoring, for example in a start-up.

In particular, with such an optical display it is also possible to manually input user inputs during the specification of an alternate palletizing pattern. For example, a user can predetermine the alternate palletizing pattern in a 2D or 3D simulation (for example by means of a 6D or space mouse) using a presentation of actual partial package stacks and actual packages supplied in the grip positions.

Such a user input can preferably be checked, for example with regard to the stability and/or density of the package stack to be further built according to the user input, whether a planned depositing position can be reached by the manipulator without collision, or the like. The operator can be supported in the user input, for example in that virtual packages snap into a grid in the planning or are aligned on edges or corners of underlying packages, or in that possible storage areas are identified. Displayed packages can advantageously be identified (in particular shown in colors) according to stability classes or product groups. If multiple storage areas (in particular partial package stacks) are provided, all are preferably shown simultaneous in order to provide a better overview to the user.

DESCRIPTION OF THE PREFERRED EMBODIMENTS

Figure 1:
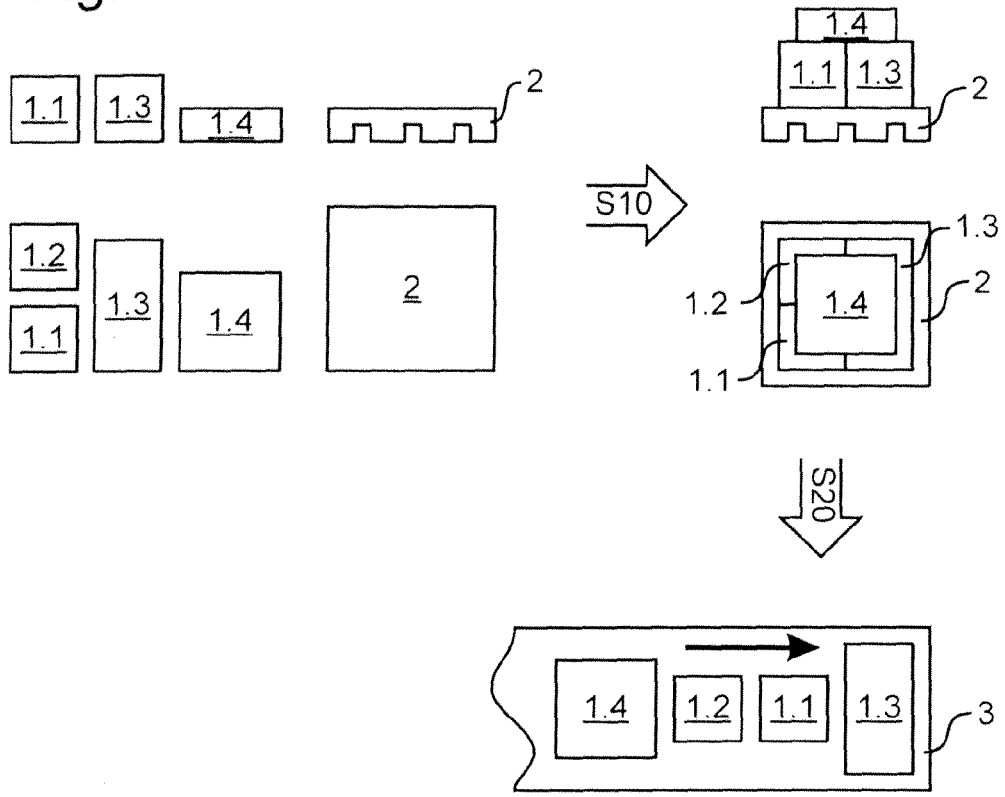
FIG. 1 illustrates steps of the method according to FIG. 6.

FIG. 1 shows in the upper left an initial package storage with four packages 1.1, ..., 1.4 that should be palletized on a pallet 2 (side view and in plan view below this).

Figure 6:
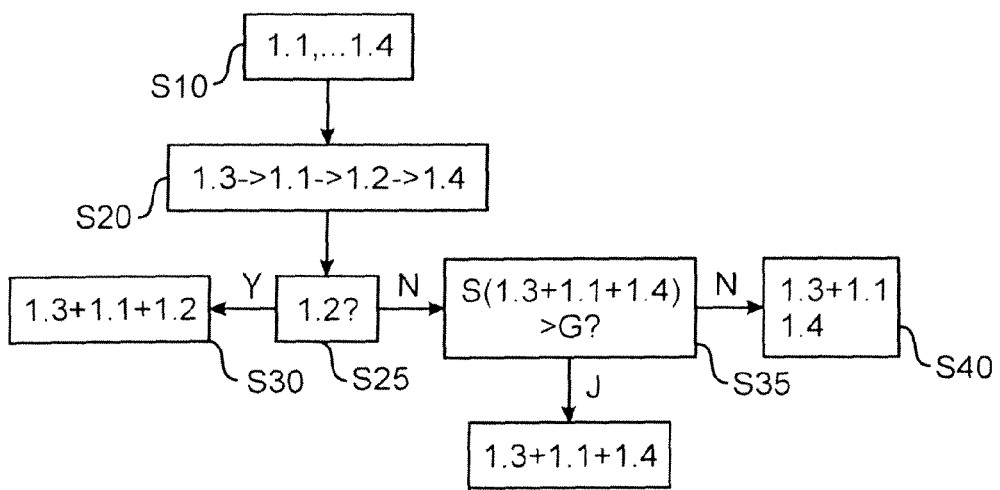
FIG. 6 shows the workflow of a method according to an embodiment of the present invention.

In a first Step S10 (see also FIG. 6), a stable and densely packed initial palletizing pattern (which is shown in at the top right in FIG. 1, again in side view and plan view) is planned by means of a known offline algorithm.

A series 1.3→1.1→1.2→1.4 of grip positions in which a robot 10 (see FIG. 2) must accept the packages 1.1, ..., 1.4 in order is determined from this initial palletizing pattern in Step S20. If the packages are individually delivered in succession on a conveyor belt 3 (shown below right in FIG. 1), this series of grip positions for the packages 1.1, ..., 1.4 respectively determines their order 1.3, 1.1, 1.2 and 1.4 on the conveyor belt 3 at the downstream end of said conveyor belt 3, as is shown below right in FIG. 1.

During the execution of this initial palletizing pattern, in Step S25 (see FIG. 6) it is checked via a camera 20 (see FIG. 2) whether the package provided as the next to be accepted by the gripper is respectively supplied in the grip position at the end of the conveyor belt 3.

Figure 2:
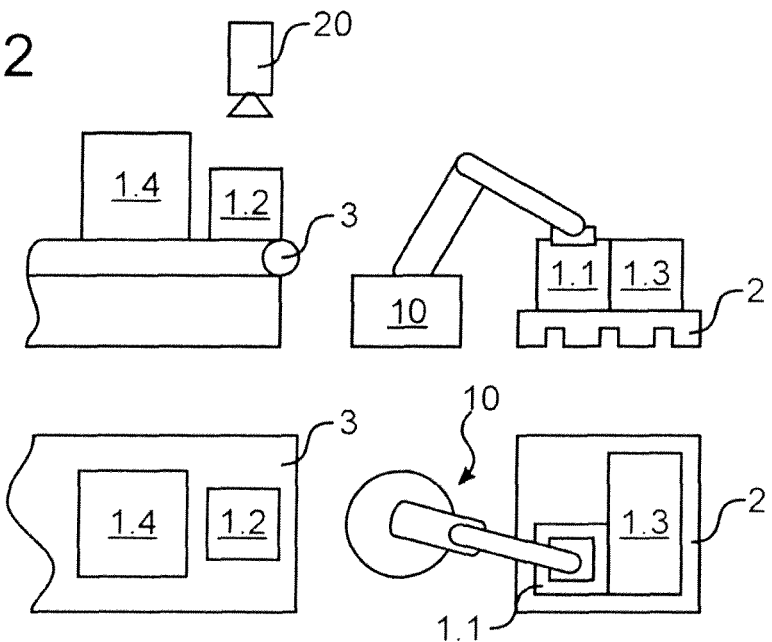
FIG. 2 shows an additional step of the method according to FIG. 6.
Figure 3:
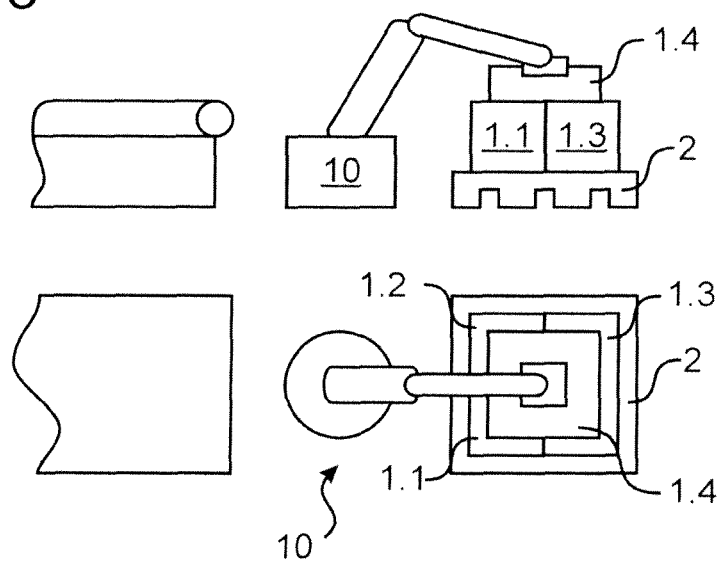
FIG. 3 shows an additional step of the method according to FIG. 2.

In the Figure sequence FIG. 2→FIG. 3 the packages 1.2, 1.4 are brought into their grip positions on the conveyor belt 3 in the correct order. The check in Step S25 is accordingly positive ("Y") and the manipulator builds the package stack 1.3+1.1+1.2+1.4 according to the initial palletizing pattern in Step S30.

Figure 4:
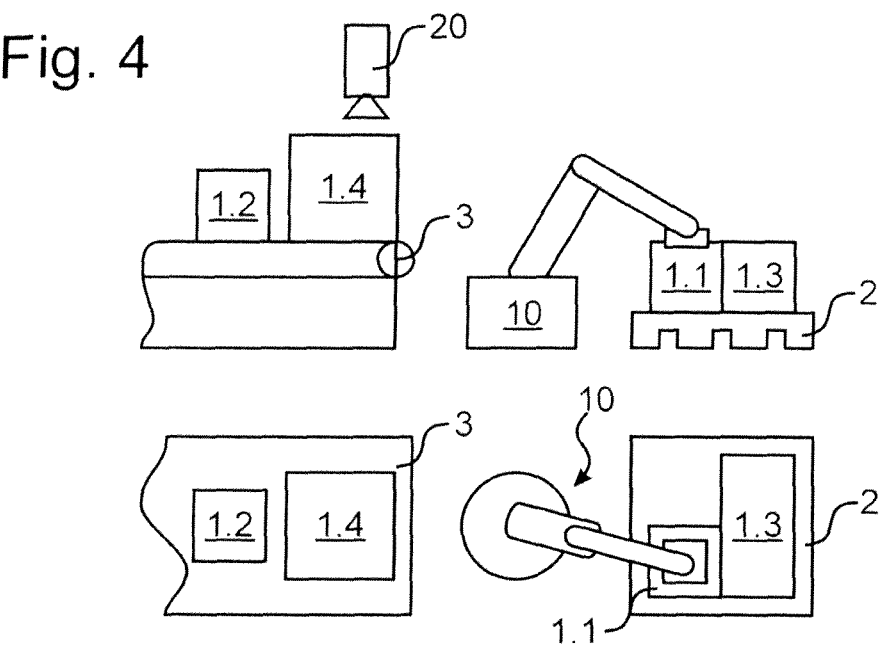
FIG. 4 shows an alternative step of the method according to FIG. 6.
Figure 4:
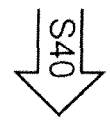
Figure 5:
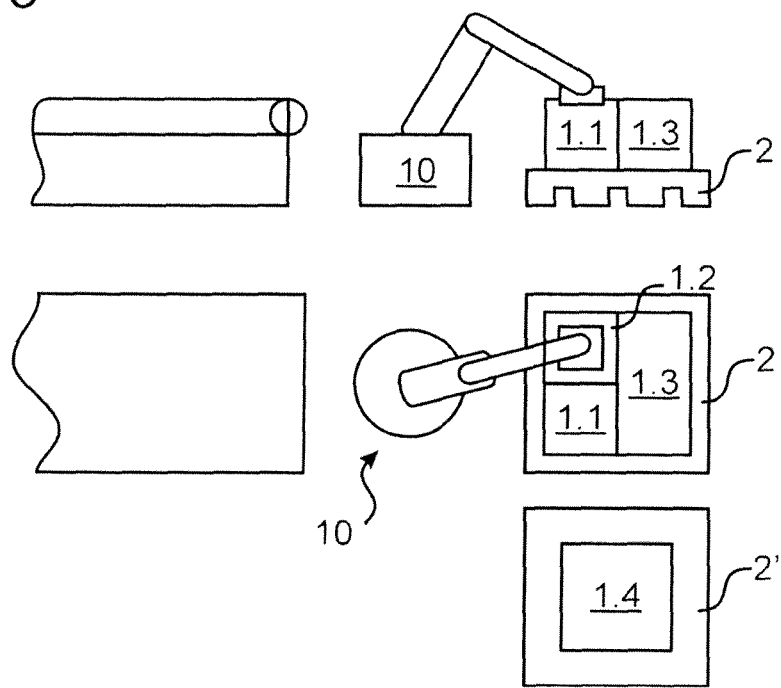
FIG. 5: shows an additional step of the method according to FIG. 4.

In the Figure sequence FIG. 4→FIG. 5 the packages 1.2, 1.4 on the conveyor belt 3 are swapped. Therefore it is established in Step S25 that the actual provided packet 1.2 is not supplied in the grip position that is associated with the partial package stack 1.3+1.1, but rather the package 1.4 (S25: "N").

Therefore a control device of the robot 10 calculates an alternate palletizing pattern. For this the algorithm initially attempts to store the available package 1.4 on the partial stack 1.3+1.1 that has already been generated, but establishes that a stability S(1.3+1.1+1.4) of the package stack that is generated in this way would fall below a limit value G (S35: "N").

Therefore, according to the alternate palletizing pattern the package 1.4 is stored on an alternative available second pallet 2' in Step S40.

These Steps are repeated until all packages to be palletized have been processed. For the package 1.2 supplied as the next one in the grip position at the end of the conveyor belt, an alternate palletizing pattern is thus generated in which it is placed in the originally provided position on the first partial stack 1.3+1.2.

After processing of all packages 1.1, . . . , 1.4 that are to be palletized, it is established that the two partial package stacks 1.3+1.1+1.2 and 1.4 can be merged. The originally planned initial palletizing pattern 1.3+1.1+1.2+1.4 is even achieved in this way without the transport of the incorrectly ordered packages having to be interrupted.

Although modifications and changes may be suggested by those skilled in the art, it is the intention of the inventors to embody within the patent warranted hereon all changes and modifications as reasonably and properly come within the scope of his or her contribution to the art.

We claim as our invention:

1. A method to palletize packages using an automated manipulator, comprising the steps of:
    in a control unit that operates an automated manipulator having a gripper, storing a sequence of respective grip positions of packages, said grip positions respectively defining a position that must be occupied by said gripper in order to grip a respective package;
    automatically checking respective grip positions in a supply of packages provided to said automated manipulator for palletizing by said automated manipulator;
    operating said automated manipulator with said control unit to palletize said packages according to a predetermined initial palletizing pattern as long as said packages in said supply of packages are supplied in said respective grip positions; and
    with said control unit, operating said manipulator to palletize said packages according to an alternate palletizing pattern, differing from said initial palletizing pattern, dependent on multiple available storage areas for said packages, if one of said packages in said supply of packages is not supplied in a grip position in said sequence.

2. A method as claimed in claim 1 comprising predetermining at least one of said sequence of grip positions and said initial palletizing pattern before supplying said packages to said automated manipulator.

3. A method as claimed in claim 1 comprising operating said automated manipulator to palletize said packages according to said alternate palletizing pattern if none of said packages supplied to said automated manipulator is in a grip position in said sequence.

4. A method as claimed in claim 1 comprising conveying said packages in respective grip positions substantially without interruption, even when it is determined that no package is supplied in a grip position in said sequence.

5. A method as claimed in claim 1 comprising generating said initial palletizing pattern and said alternate palletizing pattern with the same computerized palletizing pattern algorithm.

6. A method as claimed in claim 1 comprising determining said initial palletizing pattern based on all packages in said supply, and determining said alternate palletizing pattern dependent on individual packages supplied in respective grip positions.

7. A method as claimed in claim 1 comprising, for said alternate palletizing pattern, designating one of said available storage areas and placing at least some of said packages in said designated storage area with said automated manipulator.

8. A method as claimed in claim 1 comprising, at a display unit connected to said control unit, displaying at least one of packages supplied in said grip positions, packages already palletized, and available storage areas.

9. A method as claimed in claim 1 comprising selecting said alternate palletizing pattern according to a user input supplied to said control unit.

10. A method as claimed in claim 9 comprising, in said control unit, automatically checking the alternate palletizing pattern designated by said input with regard to at least one of a sequence of grip positions in said alternate palletizing pattern, stability of a package stack to be generated according to said alternate palletizing pattern, placement positions in said alternate palletizing pattern, and ability of said automated manipulator to implement said alternate palletizing pattern.

11. A method as claimed in claim 10 comprising, when displaying said packages, optically individually identifying packages in the display according to a predetermined classification.

12. A method to palletize packages using an automated manipulator, comprising:
    in a control unit that operates an automated manipulator having a gripper, storing a sequence of respective grip positions of packages, said grip positions respectively defining a position that must be occupied by said gripper in order to grip a respective package;
    automatically checking respective grip positions in a supply of packages provided to said automated manipulator for palletizing by said automated manipulator;
    operating said automated manipulator with said control unit to palletize said packages according to a predetermined initial palletizing pattern as long as said packages in said supply of packages are supplied in said respective grip positions; and
    with said control unit, operating said manipulator to palletize said packages according to an alternate palletizing pattern, differing from said initial palletizing pattern, generated by merging a plurality of partial stacks of said packages, if one of said packages in said supply of packages is not supplied in a grip position in said sequence.

13. A method to palletize packages using an automated manipulator, comprising:
    in a control unit that operates an automated manipulator having a gripper, storing a sequence of respective grip positions of packages, said grip positions respectively defining a position that must be occupied by said gripper in order to grip a respective package;
    automatically checking respective grip positions in a supply of packages provided to said automated manipulator for palletizing by said automated manipulator;
    operating said automated manipulator with said control unit to palletize said packages according to a predetermined initial palletizing pattern as long as said packages in said supply of packages are supplied in said respective grip positions;
    with said control unit, operating said manipulator to palletize said packages according to an alternate palletizing pattern, differing from said initial palletizing pattern, if one of said packages in said supply of packages is not supplied in a grip position in said sequence; and
    selecting said alternate palletizing pattern dependent on a characteristic value of a package stack in a storage area that is currently being stacked by said automated manipulator, and changing to a different storage area if said characteristic is below a predetermined lower limit value or exceeds a predetermined upper limit value.

14. A method as claimed in claim 13 comprising employing stability as said characteristic value.

15. A manipulator system comprising:
an automated manipulator having a gripper;
a control unit that operates an automated manipulator, said control unit being configured to store a sequence of grip positions of packages, said grip positions respectively defining a position that must be occupied by said gripper in order to grip a respective package;
said control unit being configured to automatically check respective grip positions in a supply of packages provided to said automated manipulator for palletizing by said automated manipulator;
said control unit being configured to operate said automated manipulator to palletize said packages according to a predetermined initial palletizing pattern as long as said packages in said supply of packages are supplied in said respective grip positions; and
said control unit being configured to operate said automated manipulator to palletize said packages according to an alternate palletizing pattern, differing from said initial palletizing pattern, dependent on multiple available storage areas for said packages, if one of said packages in said supply of packages is not supplied in a grip position in said sequence.

16. A non-transitory computer-readable medium encoded with programming instructions, said medium being loaded into a computerized control unit of a manipulator system, that includes an automated manipulator, having a gripper, operated by said control unit, said programming instructions causing said control unit to:
store a sequence of grip positions of packages, said grip positions respectively defining a position that must be occupied by said gripper in order to grip a respective package;
automatically check respective grip positions in a supply of packages provided to said automated manipulator for palletizing by said automated manipulator;
operate said automated manipulator to palletize said packages according to a predetermined initial palletizing pattern as long as said packages in said supply of packages are supplied in said respective grip positions; and
operate said manipulator to palletize said packages according to an alternate palletizing pattern, differing from said initial palletizing pattern, dependent on multiple available storage areas for said packages, if one of said packages in said supply of packages is not supplied in a grip position in said sequence.

17. A manipulator system comprising:
an automated manipulator having a gripper;
a control unit that operates an automated manipulator, said control unit being configured to store a sequence of grip positions of packages, said grip positions respectively defining a position that must be occupied by said gripper in order to grip a respective package;
said control unit being configured to automatically check respective grip positions in a supply of packages provided to said automated manipulator for palletizing by said automated manipulator;
said control unit being configured to operate said automated manipulator to palletize said packages according to a predetermined initial palletizing pattern as long as said packages in said supply of packages are supplied in said respective grip positions; and
operate said manipulator to palletize said packages according to an alternate palletizing pattern, differing from said initial palletizing pattern, generated by merging a plurality of partial stacks of said packages, a form of said packages in said supply of packages is not supplied in a grip position in said sequence.

18. A manipulator system comprising:
an automated manipulator having a gripper;
a control unit that operates an automated manipulator, said control unit being configured to store a sequence of grip positions of packages, said grip positions respectively defining a position that must be occupied by said gripper in order to grip a respective package;
said control unit being configured to automatically check respective grip positions in a supply of packages provided to said automated manipulator for palletizing by said automated manipulator;
said control unit being configured to operate said automated manipulator to palletize said packages according to a predetermined initial palletizing pattern as long as said packages in said supply of packages are supplied in said respective grip positions;
said control unit being configured to operate said automated manipulator to palletize said packages according to an alternate palletizing pattern, differing from said initial palletizing pattern, if one of said packages in said supply of packages is not supplied in a grip position in said sequence; and
said control unit being configured to select said alternate palletizing pattern dependent on a characteristic value of a package stacked in a storage area that is currently being stacked by said automated manipulator, and to change to a different storage area if said characteristic is below a predetermined lower limit value or exceeds a predetermined upper limit value.

19. A non-transitory computer-readable medium encoded with programming instructions, said medium being loaded into a computerized control unit of a manipulator system, that includes an automated manipulator, having a gripper, operated by said control unit, said programming instructions causing said control unit to:
store a sequence of grip positions of packages, said grip positions respectively defining a position that must be occupied by said gripper in order to grip a respective package;
automatically check respective grip positions in a supply of packages provided to said automated manipulator for palletizing by said automated manipulator;
operate said automated manipulator to palletize said packages according to a predetermined initial palletizing pattern as long as said packages in said supply of packages are supplied in said respective grip positions; and
operate said manipulator to palletize said packages according to an alternate palletizing pattern, differing from said initial palletizing pattern, generated by merging a plurality of partial stacks of said packages, a form of said packages in said supply of packages is not supplied in a grip position in said sequence.

20. A non-transitory computer-readable medium encoded with programming instructions, said medium being loaded into a computerized control unit of a manipulator system, that includes an automated manipulator, having a gripper, operated by said control unit, said programming instructions causing said control unit to:

store a sequence of grip positions of packages, said grip positions respectively defining a position that must be occupied by said gripper in order to grip a respective package;

automatically check respective grip positions in a supply of packages provided to said automated manipulator for palletizing by said automated manipulator;

operate said automated manipulator to palletize said packages according to a predetermined initial palletizing pattern as long as said packages in said supply of packages are supplied in said respective grip positions;

operate said manipulator to palletize said packages according to an alternate palletizing pattern, differing from said initial palletizing pattern, if one of said packages in said supply of packages is not supplied in a grip position in said sequence; and select said alternate palletizing pattern dependent on a characteristic value of a package stack in a storage area that is currently being stacked by said automated manipulator, and change to a different storage area if said characteristic is below a predetermined lower limit value or exceeds a predetermined upper limit value.

* * * * *